3,108,017
COATING ORGANIC FILMS WITH MIXTURE OF AMORPHOUS AND CRYSTALLINE DISPERSIONS OF VINYLIDENE CHLORIDE COPOLYMERS
Günther Messwarb, Kelkheim, Taunus, and Kurt T. Schotte and Wilhelm Dummer, both of Wiesbaden, Germany, assignors to Farbwerke Hoechst Aktiengesellschaft vormals Meister Lucius & Brüning, Frankfurt am Main, Germany, a corporation of Germany
No Drawing. Filed Nov. 25, 1960, Ser. No. 71,469
Claims priority, application Germany Nov. 28, 1959
9 Claims. (Cl. 117—138.8)

The present invention relates to an improved method for coating articles of macromolecular organic substances with the use of an aqueous dispersion of a copolymer of vinylidene chloride.

Copolymers containing a predominant proportion of vinylidene chloride meet in many respects with increasing interest as material for coating paper, films and sheets. Sheets treated with such copolymers are less permeable to steam and gas, exhibit improved aroma-preserving properties and possess an improved stability to solvents and chemicals.

The copolymers which are predominantly used for coating contain vinylidene chloride in a proportion of 80–95%.

It is known that articles which are coated with a dispersion containing a relatively high proportion of vinylidene chloride in the polymer ($\geq 92\%$), exhibit especially favorable sliding properties. The blocking effect, i.e. deficiencies produced by agglutination of wound up films, can readily be overcome by admixing the dispersion with wax.

The above dispersions involve, however, considerable disadvantages in that the substantially amorphous structure of the polymer particles, which is first obtained by polymerization in an aqueous emulsion, is soon transformed, in most cases within some days or so, into the more stable crystalline state. Dispersions of substantially crystalline vinylidene chloride copolymers are, however, unsuitable for making coherent coatings. It is therefore rather difficult to store such dispersions and to use them at an appropriate time for coating.

If relatively soft dispersions are used, i.e. dispersions of a copolymer containing vinylidene chloride in a proportion of less than 92% in the polymer phase, it is possible to increase the lifetime of the amorphous structure of the polymer particles to last for weeks or months. Coatings produced with such dispersions have, however, a stronger tendency to exhibit a blocking effect. The sliding properties of surfaces coated with such soft dispersions leave very much to be desired, and only relatively little can be done to remove these disadvantages even by admixing the dispersions with an ester wax, for example carnauba wax. On the other hand, coatings produced with such soft dispersions also exhibit some favorable properties. The coatings exhibit favorable heat sealing properties and appear to be more flexible and elastic than those produced with a "harder" dispersion of a vinylidene chloride copolymer.

The present invention which avoids all the aforesaid disadvantages is based on the observation that coatings of good film properties can be produced on articles of macromolecular organic materials by using an aqueous dispersion of a copolymer of vinylidene chloride. More particularly, the coatings are produced using a dispersion mixture containing 50–99% by weight (calculated on the content of solid in the mixture) of a dispersion of substantially amorphous copolymer particles and 50 to 1% by weight (calculated on the content of solid in the mixture) of a dispersion of substantially crystalline copolymer particles.

Generally, the mixture is prepared immediately before it is being used, but it may be stored, if desired.

The amorphous component in the above dispersion mixture is advantageously a dispersion which contains vinylidene chloride in a proportion of 85–92% in the polymer. Dispersions of that type can be obtained, for example, by the process disclosed in U.S. patent application, Serial No. 17,446, filed February 23, 1960, by Günter Messwarb et al., and now abandoned. These dispersions offer the advantage that the polymer particles remain in their amorphous structural state for a relatively long period of time so that they can be used over a prolonged period.

The crystalline dispersion component in the above dispersion mixture may be produced by any process imparting to the polymer the property of being substantially converted into its crystalline state in the dispersion. Heterogeneous copolymerization, for example, produces the desired effect with the formation of chemically very heterogeneous copolymers.

The process of this invention may be carried out using any dispersion which is based on a vinylidene chloride copolymer containing 85–95% vinylidene chloride but does not form a transparent and/or coherent film. These dispersions, when admixed with a sufficient quantity, for example 1–3%, calculated on the dispersion, of an appropriate emulsifier, such as used in German Patent 821,615, have a longer lifetime than dispersions of analogous chemical structure which are usually employed and have the tendency to undergo crystallization. It would therefore appear easy to those skilled in the art to select that dispersion which is suitable for carrying out the process of this invention. It has unexpectedly been found that a mixture of a dispersion containing substantially amorphous particles with a second dispersion whose polymer particles themselves cannot form a transparent coherent film produces completely transparent coatings having improved film properties, provided that the two dispersions are mixed with one another in an appropriate ratio. More especially, the dispersion mixture contains a maximum of ⅓ of solid material in the form of crystalline polymer.

The dispersion mixture generally contains solid material in a proportion of 10–50%, calculated on the weight of the dispersion mixture. Especially good results are obtained using a dispersion mixture which contains 20–40% solid material.

The term "vinylidene chloride copolymers" as used herein is intended to mean polymers containing 70–95%, preferably 80–92% vinylidene chloride and 30–5%, preferably 20–8%, of at least one monomer copolymerizable with vinylidene chloride. As copolymerizable monomers there may be mentioned more especially: vinyl chloride, acrylonitrile, methacrylonitrile, acrylic acid esters, methacrylic acid esters, maleic acid esters, fumaric acid esters, itaconic acid esters, the alcohol constituents of these esters containing 1–6 carbon atoms and preferably not more than 4 carbon atoms; there may also be used methylvinyl ketone, vinyl acetate and other vinyl esters, styrene, dichlorovinylidene fluoride, butadiene, chlorobutadiene, isoprene or vinylpyridine.

The articles which are coated according to this invention include hollow bodies, tubes or plates or films and sheets made from conventional macromolecular organic substances of natural or synthetic origin. There may be mentioned more especially: cellulose in native or regenerated form, for example paper, and the chemical conversion products of cellulose, such as cellulose esters, for example acetyl cellulose, nitrocellulose, cellulose acetatebutyrate, or cellulose ethers, for example methyl cellulose or ethyl cellulose. There may also be used thermoplasts, such as polyolefins, more especially polyethylene and polypropylene, polyvinyl chloride, copolymers of vinyl chloride, for example those with the aforesaid monomers, polyethylene terephthalate, mixtures of polyvinyl chloride and halogenated polyolefins, for example chlorinated polyethylene, polyvinyl alcohol, alginic acid derivatives, gelatin, casein; or polyamides, for example those of hexamethylene diamine and adipic acid or sebacic acid, polycaprolactam or polyvinyl acetals.

The polymer dispersion may also contain a small proportion, i.e. about 0.01 to 5%, advantageously 0.3–0.6%, calculated on the weight of the solid, of a substance known as sliding agent or more especially a natural or synthetic ester wax. There may be mentioned more especially: carnauba wax, spermaceti wax, candelilla wax or palm wax, or hydrogenated castor oil, benzyl stearate, pentaerythritol-distearate, pentaerythritol-tetrastearate or n-octadecylstearate.

The articles are coated with the dispersion mixture used in this invention in known manner, for example, as described in British Patents 663,645 and 744,669 or in German Patent 821,615 or in "Modern Plastics," 1958, pages 90 et seq. Aqueous dispersions are generally used but dispersions in another dispersing medium may also be used.

In order to improve the adhesiveness of the coatings produced, an intermediate layer of a fastening agent, such as a ureaformaldehyde resin or a reaction product of said resin with glycerol or glycol (U.S. Patent 2,728,688), polyalkylene imines (German Patent 752,810 and British Patent 766,827) or another suitable substance, may be applied to the article.

The following example serves to illustrate the invention, but it is not intended to limit the invention thereto:

Example 1

A commercial film of regenerated cellulose which had been pretreated by the process disclosed in British Patent 766,827, Example 1, with glycerol and polyethylene imine, was coated as described in the example of British Patent 744,669 on either side with about 5 g./m.$^2$ each (calculated on the dry substance) of the following copolymer dispersions at a rate of coating of 30 m./min.

(A) An aqueous dispersion of 91.5% vinylidene chloride
    6.8% methylmethacrylate
    1.2% acrylonitrile
    0.5% itaconic acid The dispersion was prepared by the process described in the above U.S. patent application Serial No. 17,446 and contained 66.7% chlorine, calculated on the solid substance.

(B) An aqueous dispersion of 93.0% vinylidene chloride
    6.5% methylmethacrylate
    0.5% itaconic acid which was prepared by the process described in British Patent 804,285 (Example 1). The dispersion contained 67.9% chlorine, calculated on the solid substance.

(C) An aqueous dispersion with crystalline polymer particles of 91.5% vinylidene chloride
    5.5% methylmethacrylate
    2.5% acrylonitrile
    0.5% itaconic acid prepared as described in Example 1 of British Patent 804,285.

(D) A mixture prepared from 2 parts of dispersion (A) and one part of dispersion (C).

The following coating results were obtained:

| Addition of carnauba wax in percent, calculated on solid | Transparency | Film formation | Steam permeability, g./m.$^2 \cdot$24 h. | Sliding properties | Blocking | Period during which dispersion can be used |
|---|---|---|---|---|---|---|
| (A) without | good | good | | poor | strong | >1 month |
| (A) ½ | do | do | | moderate | moderate | Do. |
| (B) ½ | do | do | 1.9 | good | no | stable for 3 weeks only. |
| (C) without | poor | poor | 1 | | | |
| (D) without | good | good | 1.6 | good | no | >1 month. |

The same coating results were obtained on sheets of polyethylene, polyethylene terephthalate or a mixture of vinyl chloride and chlorinated polyethylene.

We claim:

1. A process which comprises coating an article of a macromolecular organic substance with a mixture of aqueous vinylidene chloride copolymer dispersions, one dispersion containing substantially amorphous copolymer particles in a proportion of 50 to 99% by weight, calculated on the solids content of the total dispersion mixture, and the second dispersion containing substantially crystalline copolymer particles in a proportion of 50 to 1% by weight, likewise calculated on the solids content of the total dispersion mixture.

2. The process of claim 1 wherein the macromolecular organic material is a film of regenerated cellulose.

3. The process of claim 1 wherein the macromolecular organic material is a film of paper.

4. The process of claim 1 wherein the macromolecular organic material is a film of polyethylene terephthalate.

5. The process of claim 1 wherein the macromolecular organic material is a film of polyethylene.

6. The process of claim 1 wherein the macromolecular organic material is a film prepared from a mixture of a polyvinylchloride and a chlorinated polyolefin.

7. The process of claim 1 wherein an ester wax emulsion is added to the polymer dispersion as a sliding agent.

8. The process of claim 1 wherein the copolymer consists of 80–95% vinylidenchloride and 20–5% acrylonitrile.

9. The process of claim 1 wherein the copolymer consists of 80–95% vinylidene chloride and 20–5% of a methacrylic acid ester.

References Cited in the file of this patent

UNITED STATES PATENTS

| | | |
|---|---|---|
| 2,294,651 | Billing | Sept. 1, 1942 |
| 2,909,449 | Banigan | Oct. 20, 1959 |
| 2,910,385 | Berry et al. | Oct. 27, 1959 |
| 2,940,889 | Justice | June 14, 1960 |